May 19, 1953

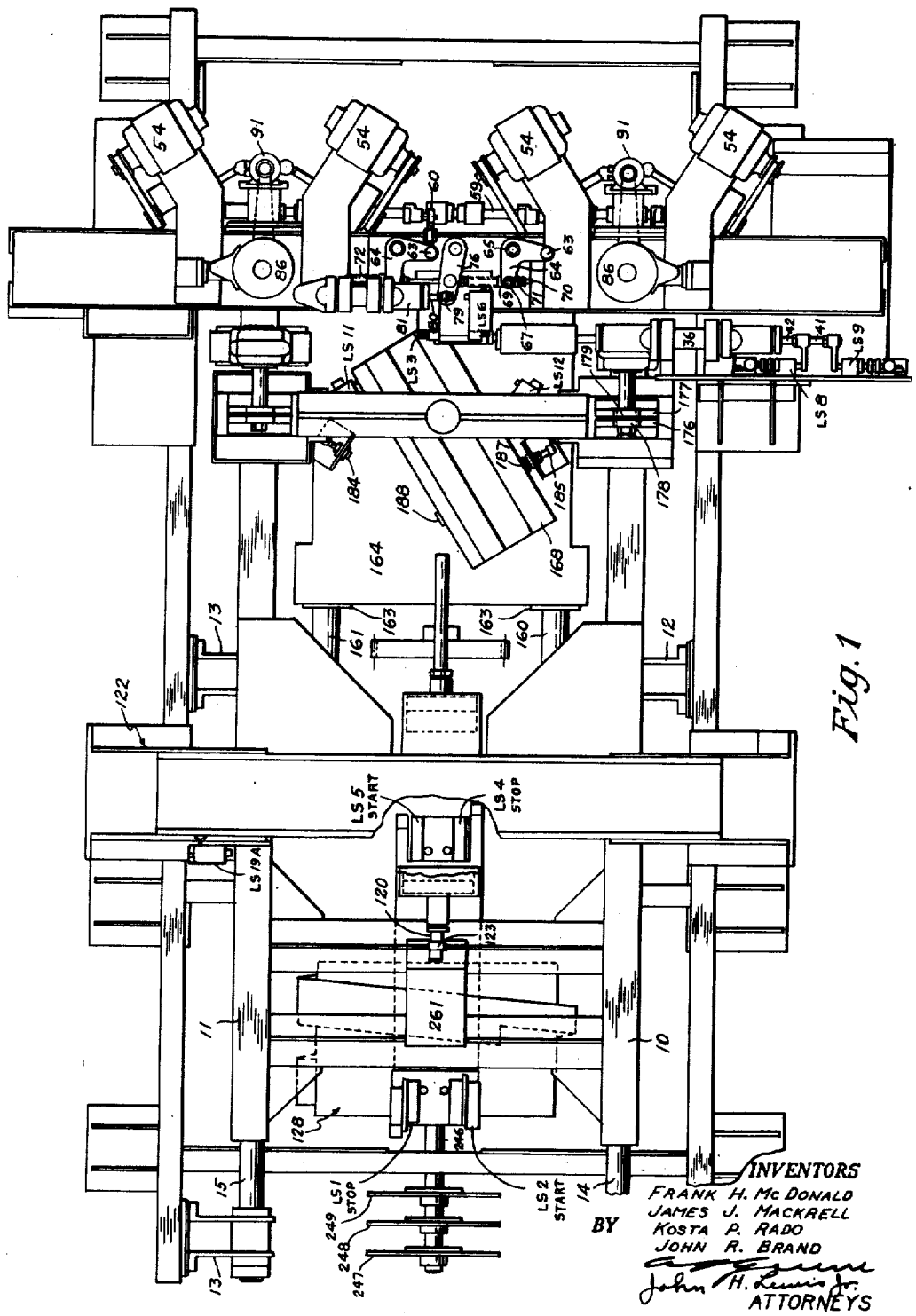

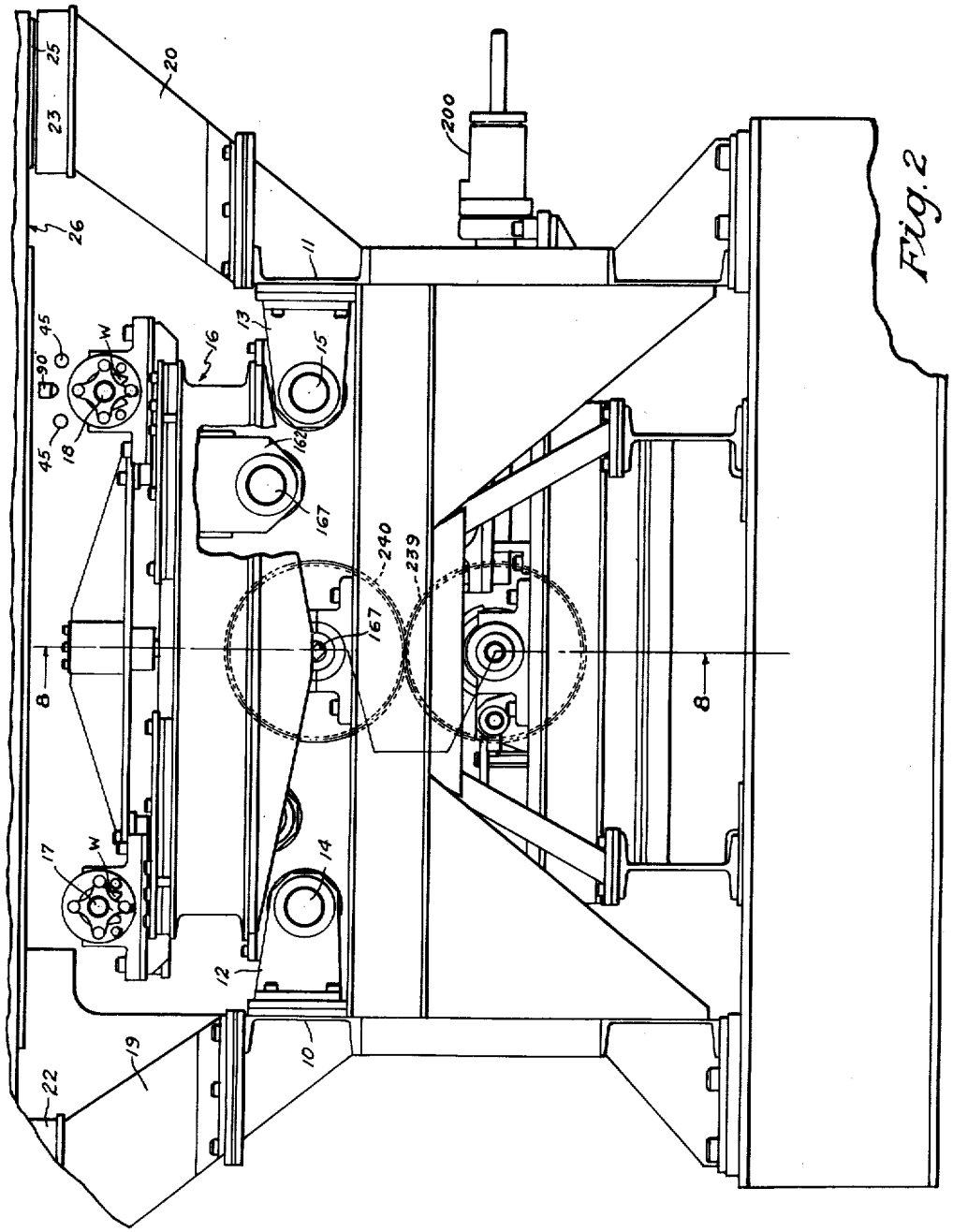

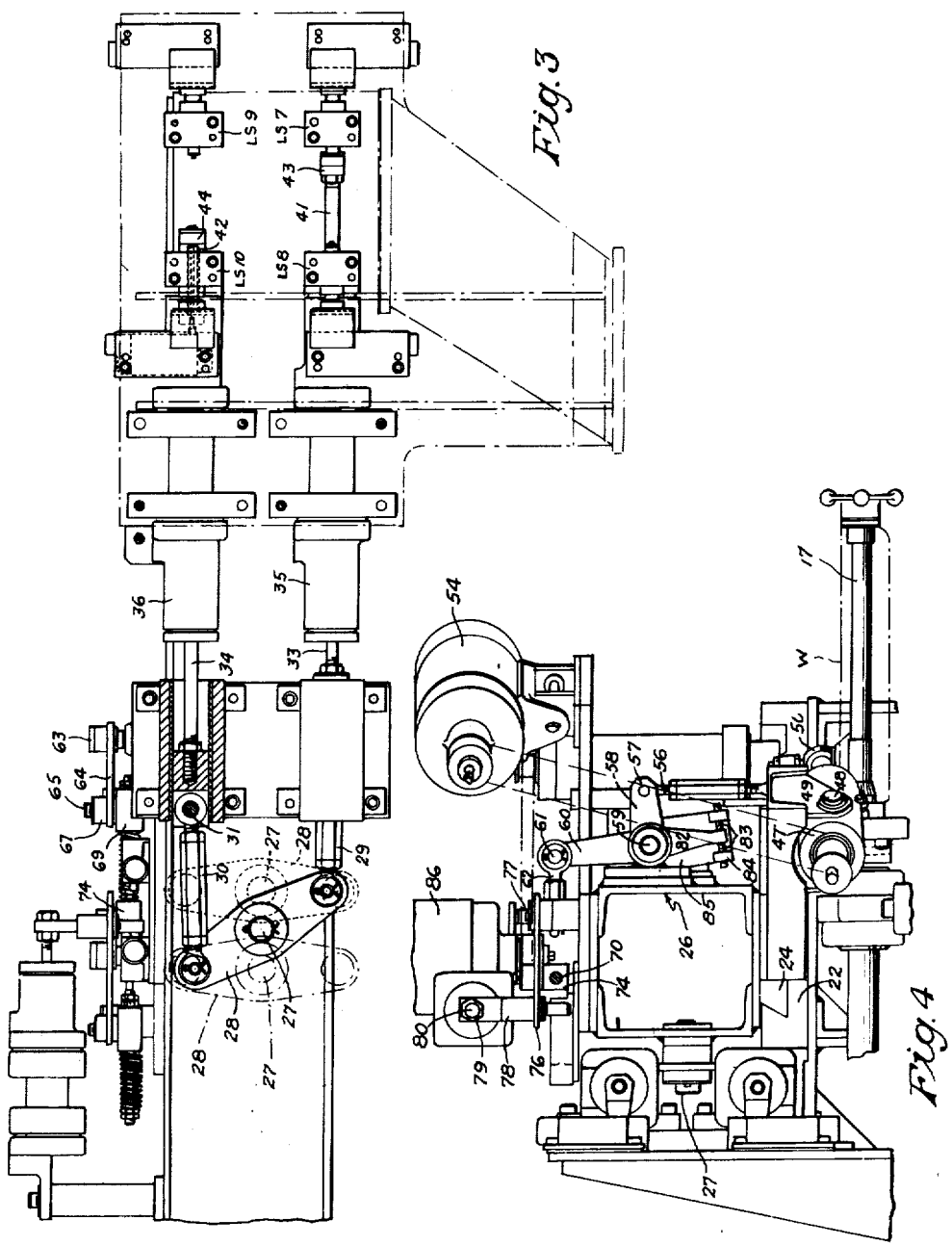

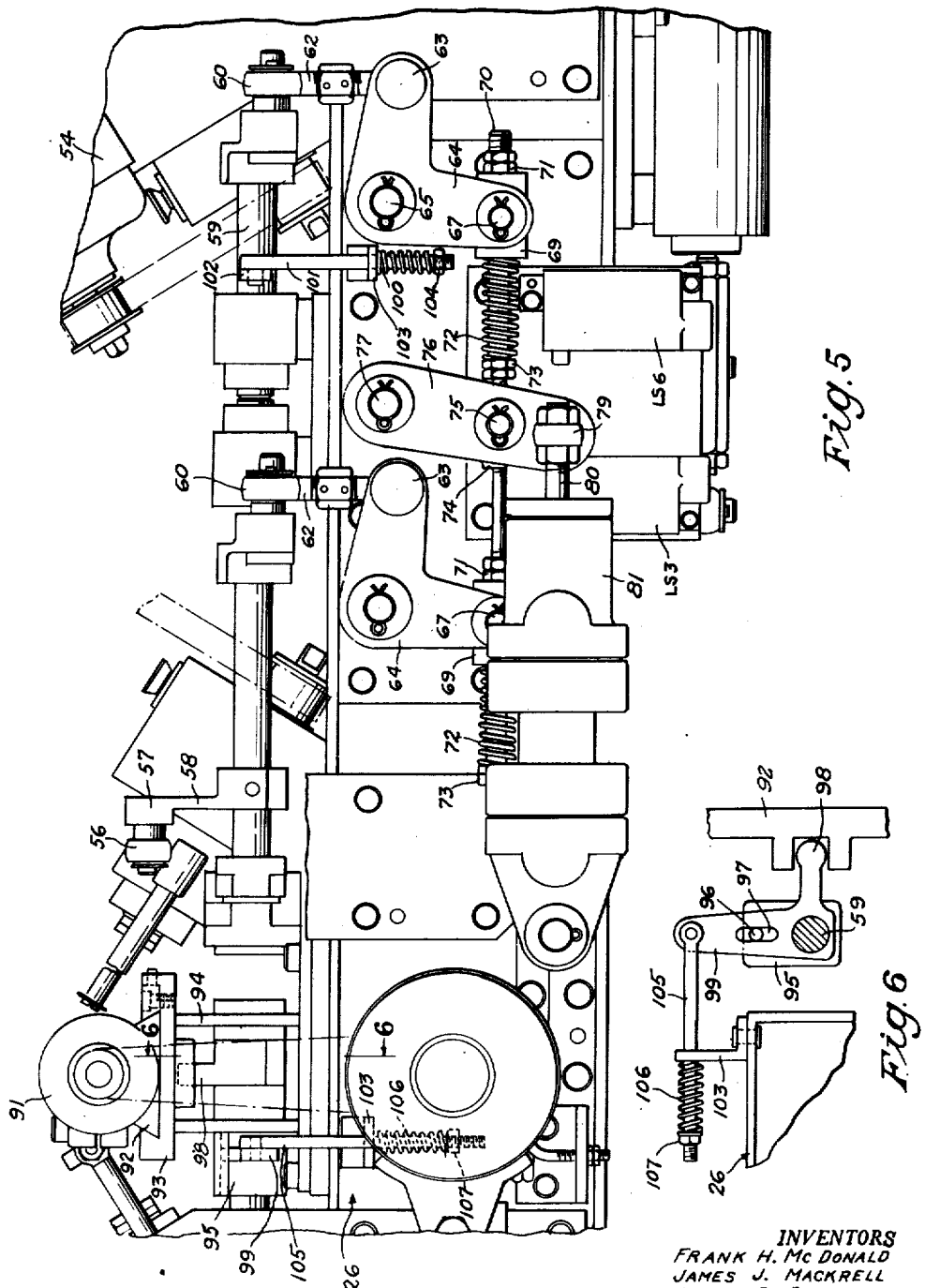

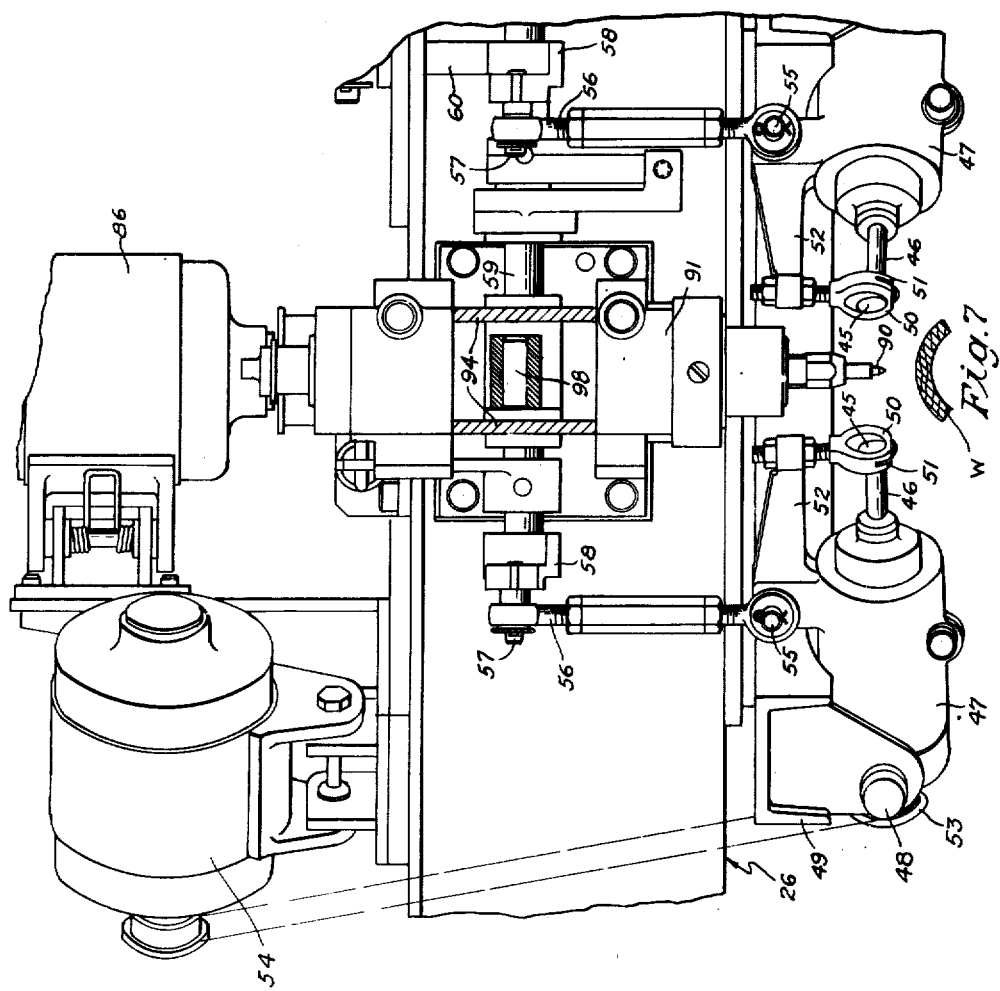

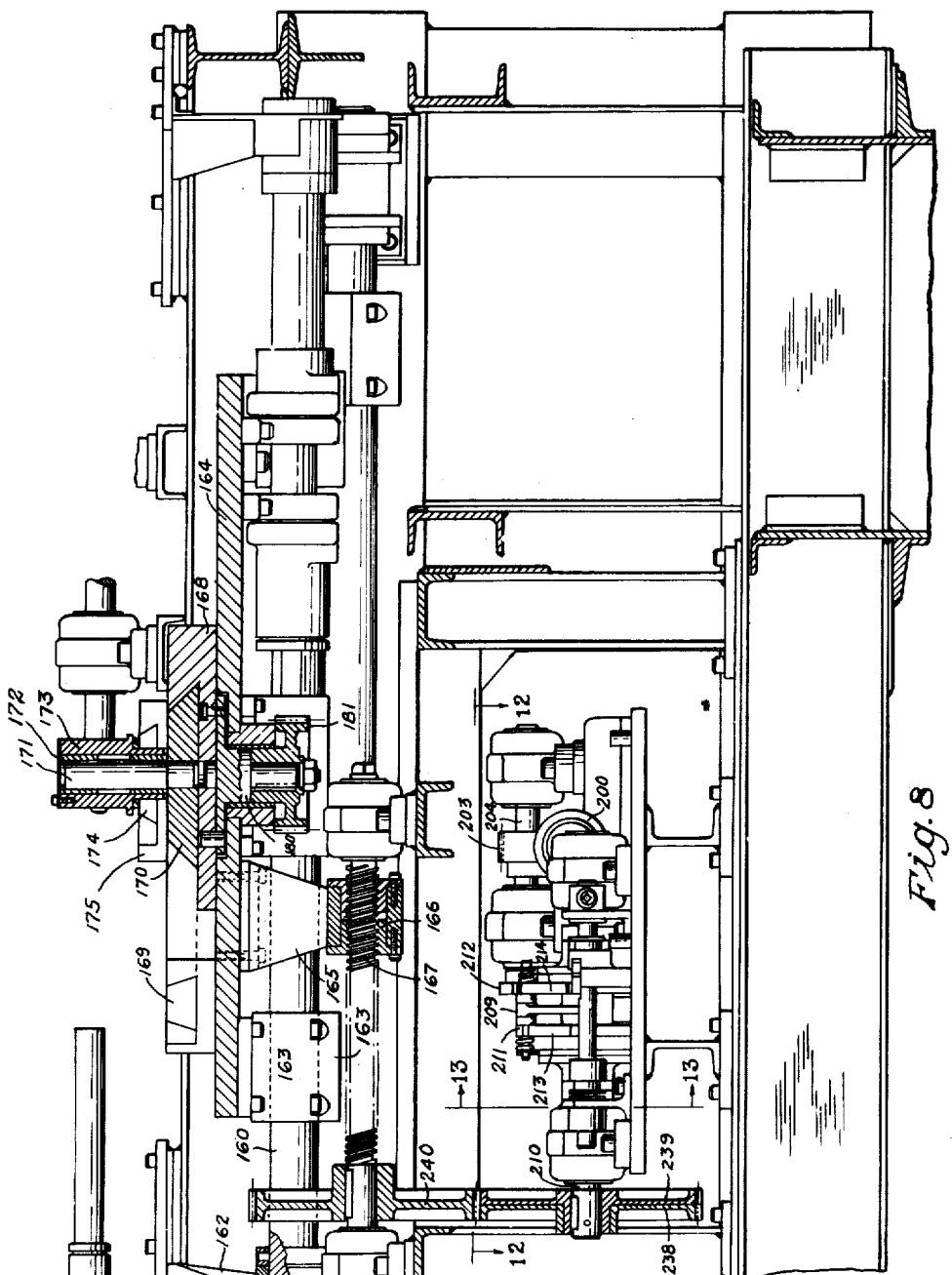

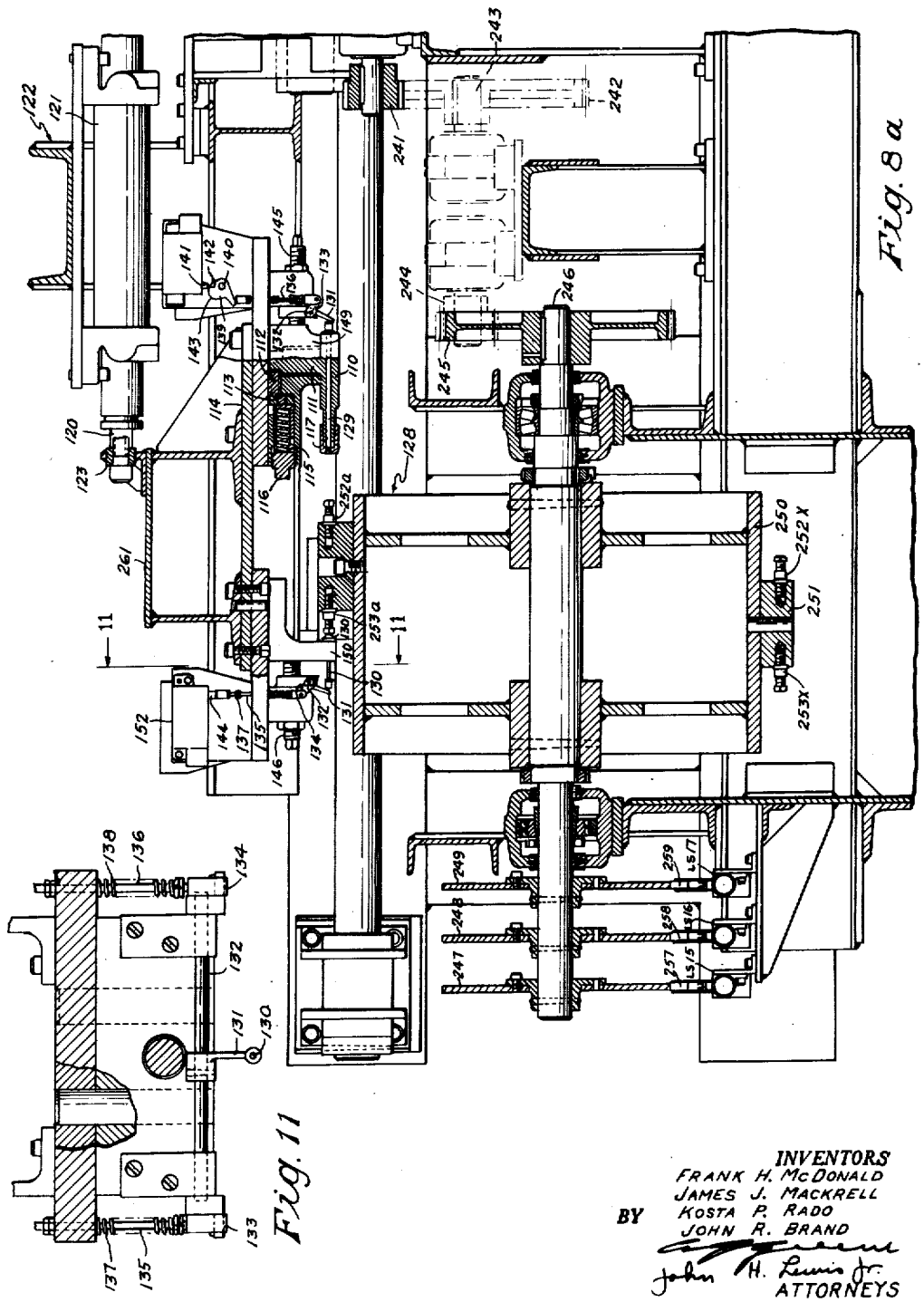

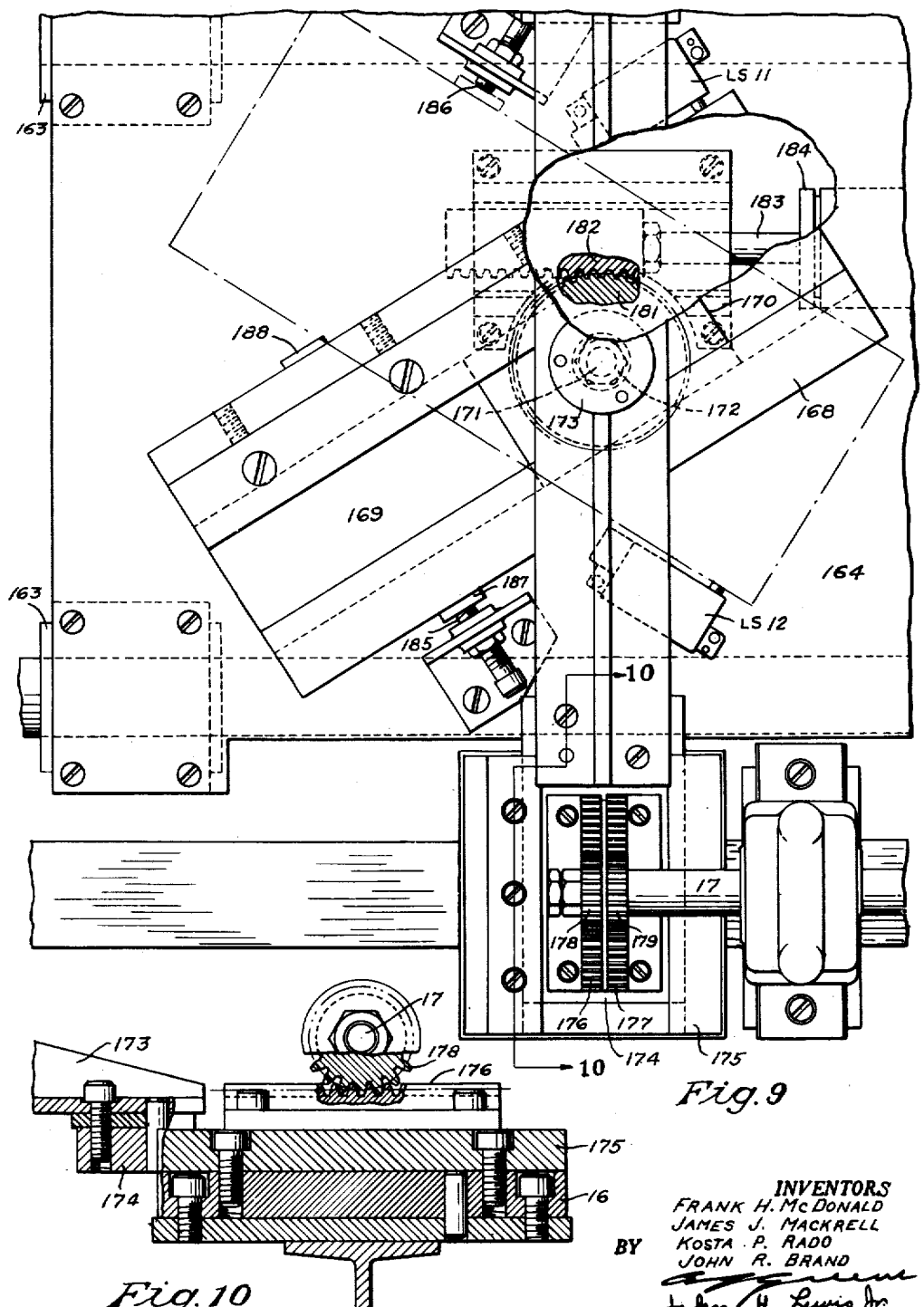

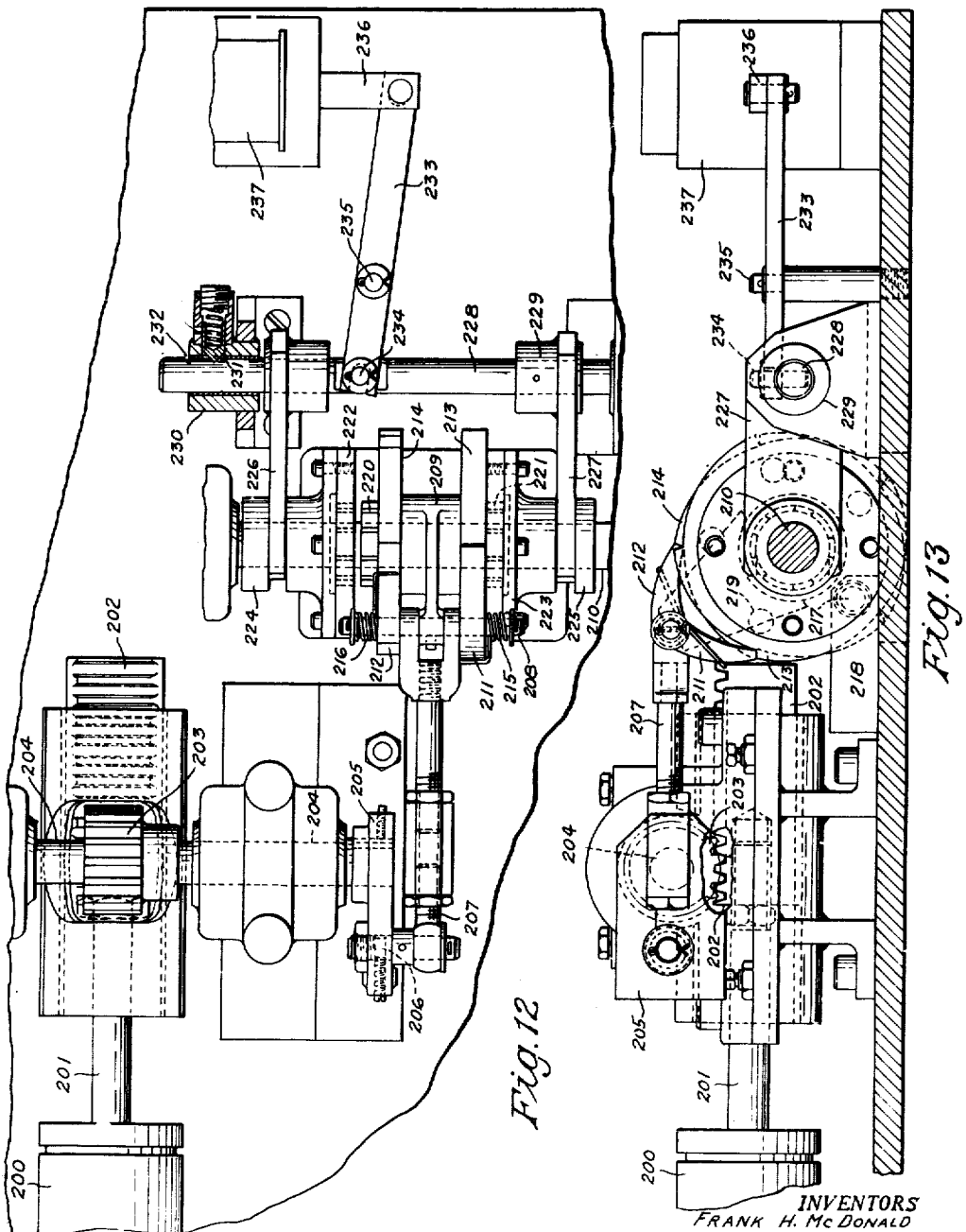

F. H. McDONALD ET AL 2,638,946

CHECKERING MACHINE

Filed Nov. 23, 1948

INVENTORS
FRANK H. McDONALD
JAMES J. MACKRELL
KOSTA P. RADO
JOHN R. BRAND
BY
John H. Lewis Jr.
ATTORNEYS

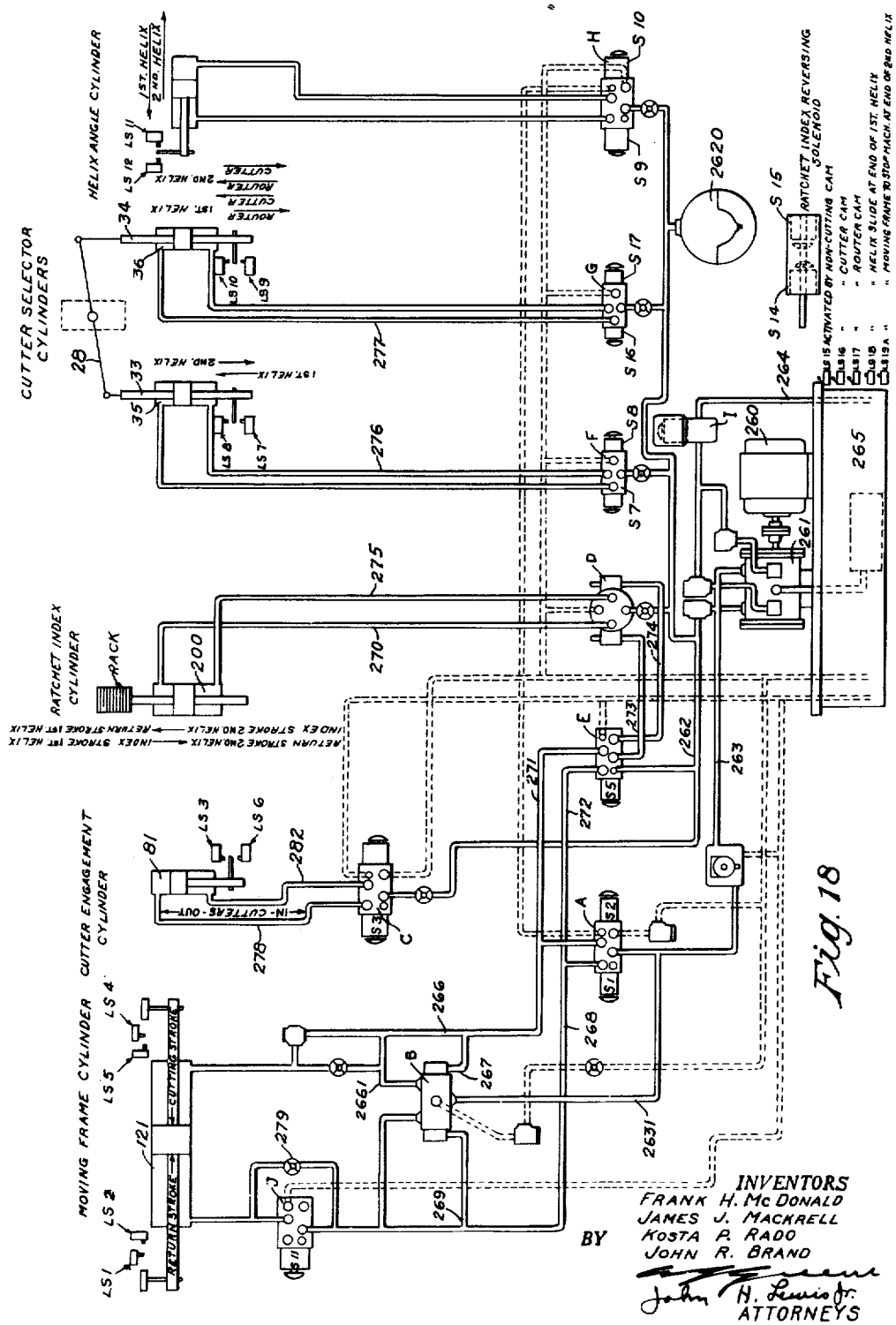

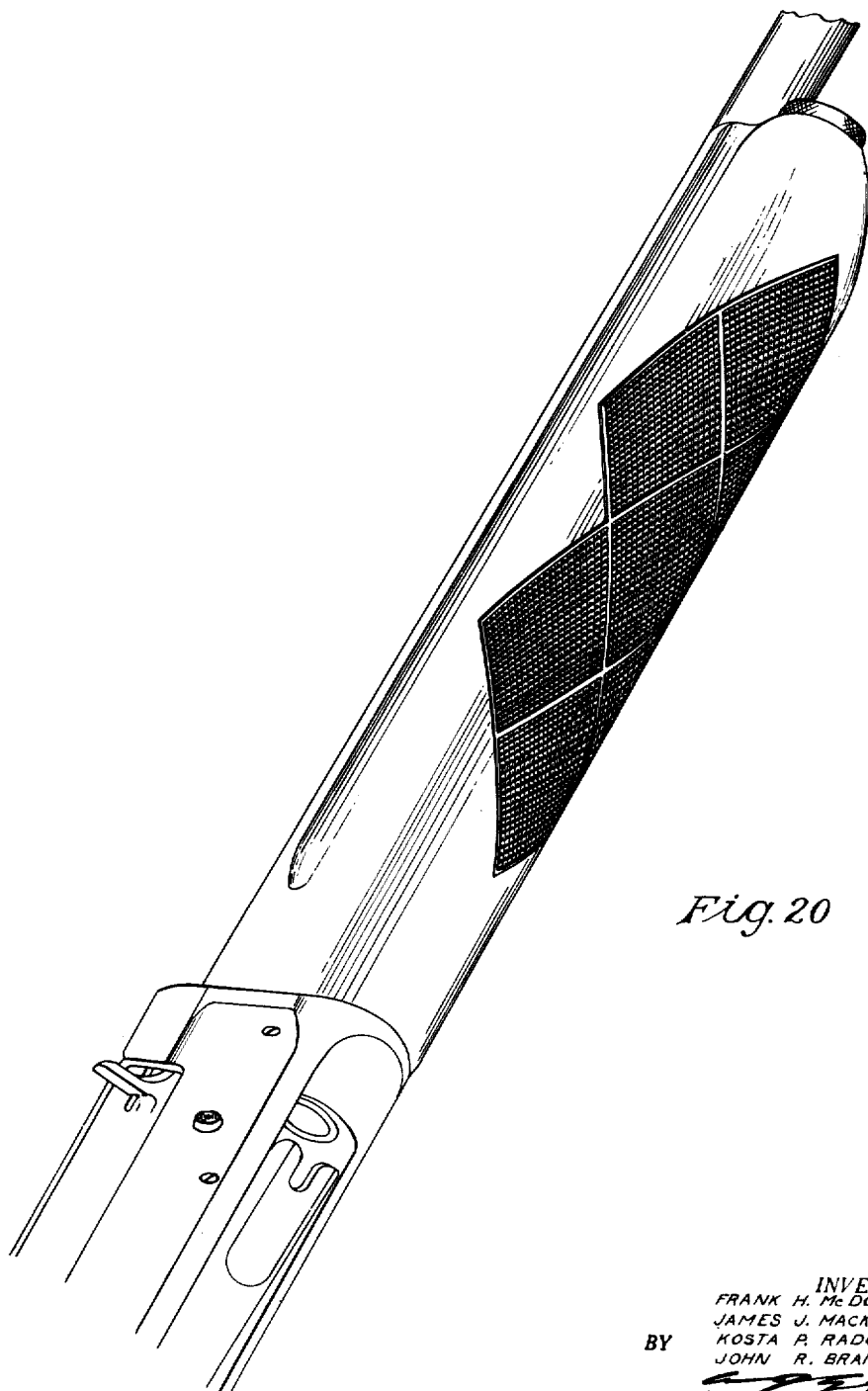

Patented May 19, 1953

2,638,946

UNITED STATES PATENT OFFICE 2,638,946

CHECKERING MACHINE

Frank H. McDonald, Ilion, and James J. Mackrell, Brooklyn, N. Y., Kosta P. Rado, Huntington, Conn., and John R. Brand, Claymont, Del., assignors to Remington Arms Company, Inc., Bridgeport, Conn., a corporation of Delaware Application November 23, 1948, Serial No. 61,682

32 Claims. (Cl. 144—136)

This invention relates to apparatus for the mechanical production of a pattern of "checkering" on the fore-ends of firearms.

GENERAL FUNCTIONING

A typical pattern, as shown in Fig. 15, consists of two intersecting series of accurately spaced parallel grooves, the whole being surrounded and sometimes intersected in a regular pattern by a border groove of a width and configuration differing somewhat from the checkering grooves. The fore-end surface to which the pattern is applied is generally cylindrical, and each individual bordering and checkering groove is a helix. The grooves of one set spiral to the right while the grooves of the second set spiral to the left from a given starting point. For brevity and convenience in this specification and the claims appended thereto, the term "helix" will be used as indicating and including, as the context requires, not only a single line or groove but a complete set of helical lines or grooves extending parallel to each other in a predetermined spacing.

The machine of this invention is of the duplex type, and fully automatic. It comprises two work-holding arbors upon which the pieces to be checkered are secured. The machine being loaded and started, the entire sequence of operations necessary for making the two intersecting sets of checker and border cuts are performed automatically, and the machine is automatically stopped for reloading. Its general functioning may be outlined as follows:

The work-holding arbors are mounted upon a carriage which is reciprocated through its connection with a fixedly mounted hydraulic cylinder. The valves of this cylinder are controlled by solenoids which are actuated when the travel of the carriage brings certain devices thereon into engagement with stops on an indexed stop wheel. Said wheel is indexed as an incident to each return or backward movement of the carriage. Thus, by an appropriate location of the stops thereon, the carriage may be started and stopped in any positions desired within the full range of its possible movement. The indexing of the stop wheel is controlled by the same devices on the carriage which stop the carriage at the end of its advance or working stroke.

Three cutters are associated with each work-arbor. The entire set of cutters are mounted on a slide which is hydraulically shiftable transversely of the machine. Thus, any one of the three cutters may be selected and, by simultaneous vertical movement of all of the cutters, brought into the correct position to operate on the workpiece. The selected cutter, after its selection, is lowered, in properly timed relation to the movement of the main carriage, to engage the workpiece. There is one circular saw type cutter for cutting each of the two sets of intersecting lines which form the checker pattern, while the third cutter is a vertically disposed router which cuts border grooves in both directions. Cutter selection is under the control of a set of cam disks which move with the aforementioned indexed wheel and, through microswitches, actuate certain solenoids controlling hydraulic valves for effecting the desired selection.

Each of the two sets of lines or cuts which constitute the checker pattern extends diagonally of the workpiece at a desired angle. This direction of cut is secured by rotating the workpiece as it is moved longitudinally with the main carriage. Such rotation is secured by causing the movement of the main carriage to shift a block in a diagonally disposed way. Secured to the block are transversely extending racks which engage pinions associated with each of the work-arbors. After the completion of a single cut, it is necessary to rotate or index the work an amount sufficient to place the next cut in proper spaced relation to the first one. Since there are two sets of such diagonally disposed cuts to be made, it is necessary to provide a reversible mounting for said block or helix slide so that for one set of cuts the work-arbors are rotated in one direction, while for the second set of cuts they are rotated in the reverse direction.

While the present machine embodies but two work-holding arbors and associated mechanisms, it will be obvious that the number of arbors could be increased indefinitely.

DRAWINGS

In the drawings:

Fig. 1 is a somewhat diagrammatic plan view of the machine as a whole.

Fig. 2 is an elevation of the end of the machine from which it is operated.

Fig. 3 is a fragmentary rear elevation of the cutter slide actuating devices.

Fig. 4 is a fragmentary side elevation, showing the mechanism for cutter selection and actuation.

Fig. 5 is a fragmentary plan view of the cutter selecting and actuating devices.

Fig. 6 is a fragmentary sectional elevation on the line 6—6 of Fig. 5.

Fig. 7 is a fragmentary front elevation, showing the cutters and their selecting and actuating devices.

Figs. 8 and 8a together are a longitudinal sectional elevation, substantially on the line 8—8 of Fig. 2.

Fig. 9 is a fragmentary plan view of the index slide and associated parts.

Fig. 10 is a section on the line 10—10 of Fig. 9.

Fig. 11 is a section on the line 11—11 of Fig. 8a.

Fig. 12 is a plan view of the indexing mechanism, as seen from line 12—12 of Fig. 8.

Fig. 13 is an elevation of the indexing mechanism, substantially on the line 13—13 of Fig. 8.

Figure 14:
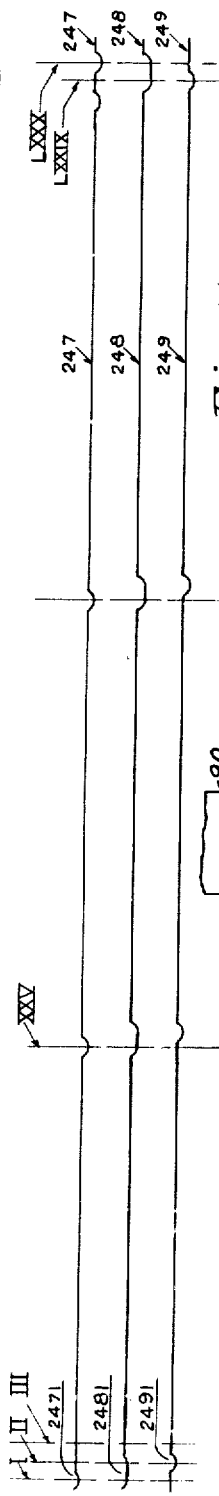

Fig. 14 is a diagrammatic development of the peripheries of the three indexed cams which control cutter selection.

Figure 15:
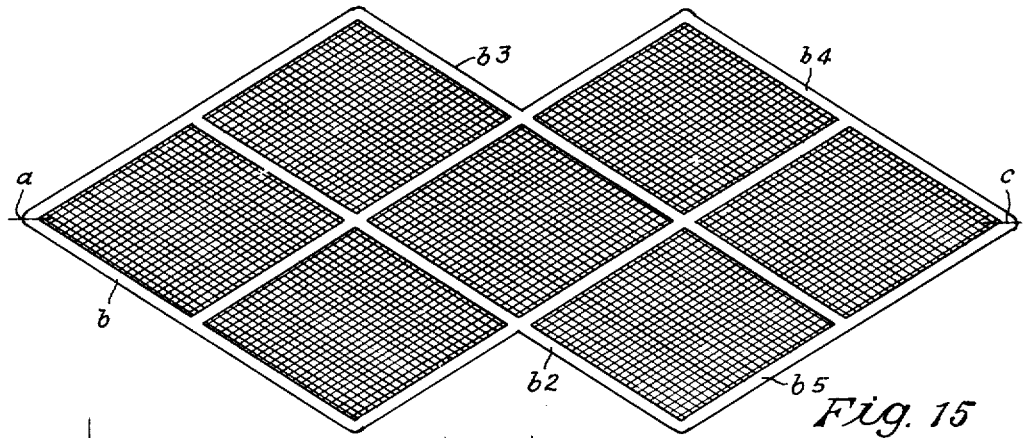

Fig. 15 is a somewhat diagrammatic development of a typical checker pattern.

Figure 16:
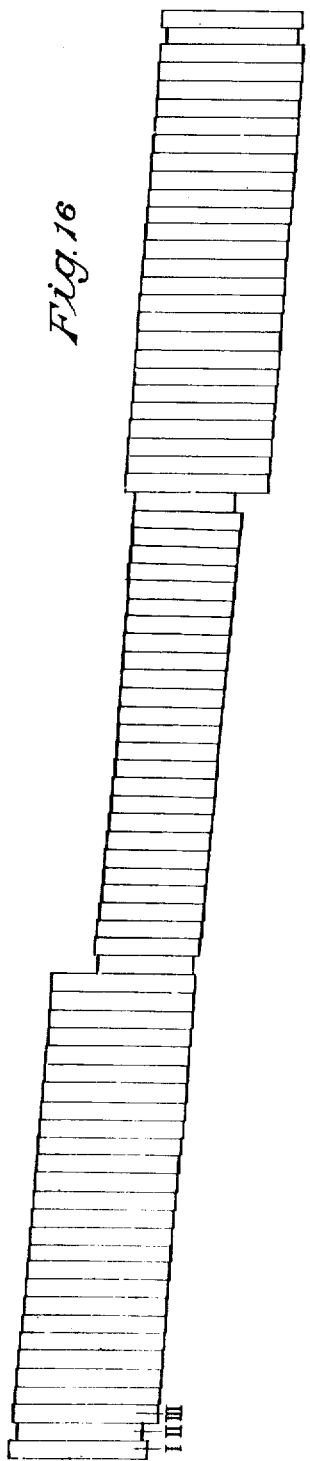

Fig. 16 is a diagrammatic development of a typical set of carriage stroke controlling stops on the index wheel, the stops being arranged to produce a somewhat different pattern.

Figure 17:
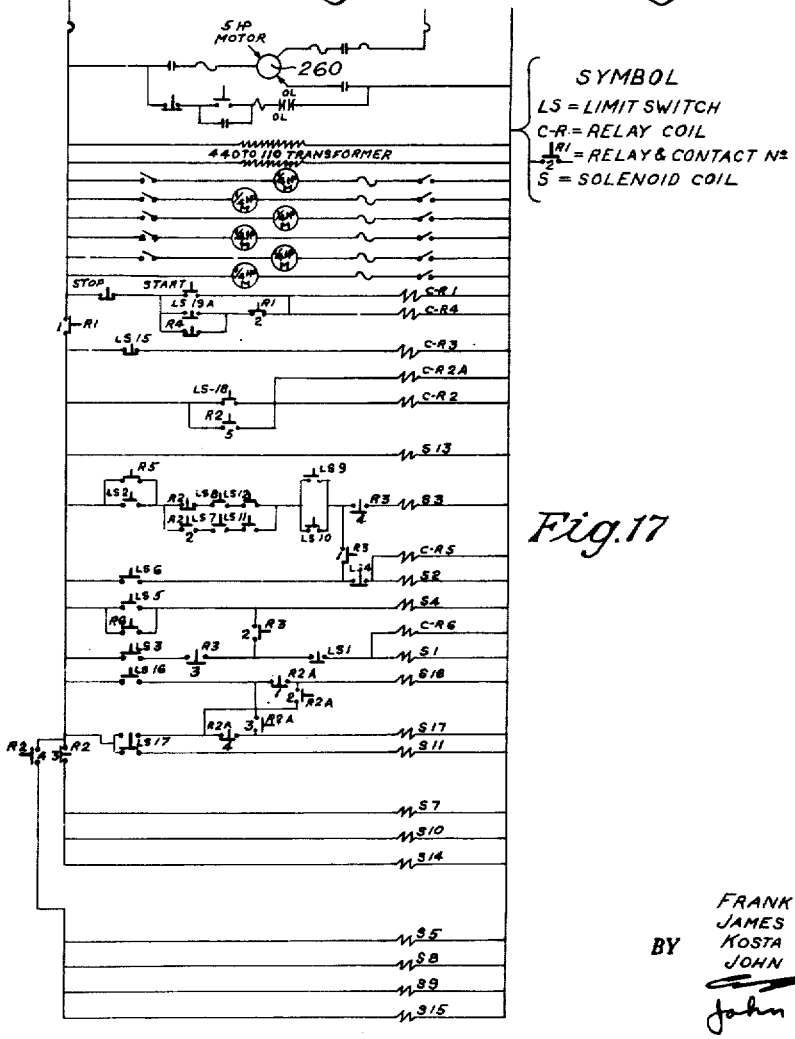

Fig. 17 is the electric wiring diagram.

Fig. 18 is the hydraulic circuit diagram.

Figure 19:
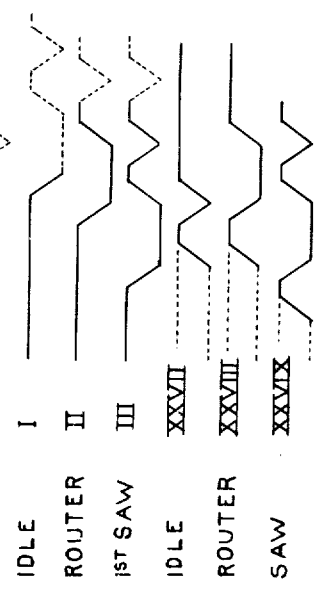

Fig. 19 is a fragmentary enlarged diagrammatic showing of the work and the tools.

Fig. 20 shows a portion of a firearm including a fore-end having thereon a checker pattern of the type shown diagrammatically in Fig. 15.

MAIN SUPPORTS

The main supporting frame may be of welded and riveted structural steel shapes and comprises, among other members, a pair of side channels 10 and 11, to each of which is secured a pair of brackets, as shown at 12 and 13. Said brackets support rods 14, 15, extending longitudinally of the machine and having slidably supported thereon a reciprocating main carriage identified generally by numeral 16. Mounted on top and adjacent one end of the main carriage are a pair of work-holding arbors 17 and 18 adapted to carry workpieces identified as "W." These arbors reciprocate with the main carriage and are rotated in either direction from the central or starting position indicated in Fig. 2 by means to be hereinafter described. Certain tools and controls associated with the two arbors are duplicates, and insofar as practicable one set only of such duplicate members will be described.

CUTTER AND ROUTER SELECTION AND ACTUATION

Three different tools operate upon each workpiece W. These tools are: a circular saw, for cutting checkering grooves of one inclination or helix; a second circular saw, for cutting checkering grooves of the opposite inclination; and, a router, for making the bordering grooves. These tools are ranged in line transversely of the work-holding arbors on a common mounting frame which is shifted to bring the desired cutter substantially directly above the workpiece. The operating position of the router is slightly off-center for the reasons hereinafter discussed.

The mounting and operation of the cutters may be as follows:

Secured to arms 19 and 20, projecting upwardly and outwardly from the main frame, are cutter frame supporting ways 22 and 23, each of which comprises a dovetail groove adapted to receive a dovetail base 24, 25, depending from the transversely slidable cutter supporting frame which is identified generally as 26. As clearly seen in Fig. 4, this frame may conveniently be of substantially square cross-section fabricated from structural steel shapes. To secure transverse movement of the cutter frame as desired, there is secured to one side thereof a stub shaft or arbor 27 upon which is pivotally mounted a two-armed lever or crank 28. The ends of the arms of the lever 28 are pivotally joined to adjustable connecting rods 29 and 30, which connecting rods are pivoted, as shown at 31, to piston rods 33, 34, actuated by hydraulic cylinders 35, 36, secured to the main frame. Fig. 3 shows the piston of cylinder 35 in its right-hand position, the piston of cylinder 36 in its left-hand position, and the crank 28 correspondingly inclined. In this condition the cutter frame is in its intermediate or central position, selecting the router. Obviously, the position of the cutter frame will be the same if the positions of the two pistons are reversed, that is, the piston 35 is shifted to the left and the piston 36 to the right. If both pistons are in the leftward position, the crank pivot arbor 27 and with it the cutter frame is shifted to the dotted line position (Fig. 3), displacing the router from work-engaging position, and bringing one of the saws into work-engaging position. If both pistons are moved to the right, the crank and its pivot assume the broken line position, and the second or opposite saw is similarly selected. To insure that certain operations occur only when piston rods 33 and 34 are at rest in their end positions, four micro-switches (limit switches) LS-7, LS-8, LS-9 and LS-10, are positioned to be actuated by rods 41, 42, extending from the back ends of cylinders 35, 36, respectively, and moving with piston rods 33 and 34. Said rods 41, 42, carry suitable adjustable abutments 43, 44, to enable the actuation of one of the micro-switches at each end of the stroke of each piston. The closing of any two of the switches LS-7, LS-8, LS-9, LS-10, enables the actuation of the cutter advancing device to be described.

The means for controlling the flow of hydraulic fluid to cylinders 35 and 36, to effect cutter selection as desired, will be hereinafter described.

The cutters and their operating devices are all mounted on the transversely shiftable cutter slide or frame 26. Each saw 45 (Fig. 7) is carried at the end of a spindle 46 mounted in a bearing member 47 pivoted at 48 in a bracket 49 depending from the frame 26. Each bearing and spindle is disposed at an angle to the axis of the work-holding arbor corresponding to the angle of the pattern to be cut. Associated with each saw is a cutter depth control member comprising a yoke 50 having therein a slot 51 through which the lower margin of circular saw 45 projects. Each yoke is adjustably secured in an arm 52 projecting from bearing member 47. Each spindle 46 carries a pulley 53 adapted to receive a belt driven by a motor 54 mounted on top of frame 26 in an angular position corresponding to the angular position of spindle 46. Each motor mounting comprises a conventional pivot and spring by which proper tension on the drive belt is maintained as the cutter spindle is oscillated in the manner to be described.

Pivoted at 55 (Fig. 7) to each spindle bearing member 47 is an adjustable link 56, which link is likewise pivoted at 57 to an arm 58 projecting laterally from a rock shaft 59 supported in brackets extending from the front of the cutter frame. While a unitary rock shaft extending substantially the entire width of the machine may well serve for the actuation of all cutters and routers, it has been found desirable to separate the rock shaft into four sections, two sections being associated with each work-holding arbor. As shown in Figs. 4, 5 and 7, an arm 60 projecting upwardly from a section of rock shaft associated with each arbor has pivoted thereto at 61 a short adjustable link 62 pivoted at 63 to a bell crank 64 which is pivoted at 65 on the top of the cutter frame 26. The opposite arm of each bell crank is pivoted to a short post 67 extending laterally from a collar 69 loosely carried on a thrust rod 70. One end of each collar 69 engages adjustable nuts 71 on thrust rod 70, while the opposite end of each collar is engaged by a spring 72 surrounding said rod 70 and abutting nuts or other adjusting means 73 secured to the thrust rod. Likewise secured to thrust rod 70 is a boss 74 from which extends a stud 75 loosely received in an aperture in a lever 76 pivoted to the cutter frame at 77. Lever 76 extends from its pivot beyond the stud 75 and is apertured to receive the end portion of a short post 78 rigidly connected at 79 to a piston rod 80 projecting from an hydraulic cylinder 81. It will be apparent that, through the train of connections just described, movement of piston 80 in either direction will oscillate the rock shaft 59 and raise or lower the saw 45. Limit switches LS–3 and LS–6 require that the piston 80 be in one of its end positions (cutters either fully advanced or fully retracted) before certain other operations can be performed.

For convenience of construction and accuracy of operation, rock shaft 59 is, as above mentioned, separated into four sections, two sections being associated with one work arbor and two sections with the opposite work arbor. The arrangement above-described is duplicated for each of the work arbors, and is effective to lift and lower the two saws nearest the center of the machine. The two outside saws and the two routers are actuated respectively by the two end sections of rock shaft, each of which is adjustably connected to a driven section thereof by suitable means, one form of which is illustrated in Fig. 4. Depending from each driven section of rock shaft 59 is an arm 82 having an end portion of reduced dimensions which is received between adjustable screws 83 secured in ears 84 which extend laterally from an arm 85 of appropriate width secured to each of the outside or end sections of rock shaft 59. This construction provides for any needed relative adjustment of the several sections of the rock shaft and parts actuated thereby.

Each router 90 (Fig. 7) is carried at the lower end of a spindle having a bearing in a spindle housing member 91 provided with a dovetail base 92 (Fig. 5) received in a vertically disposed dovetail guideway 93 secured to but spaced from the side of cutter frame 26. Rock shaft 59 extends between the cutter frame and the base guideway 93, and through the arms 94 by which the base guideway is secured to the cutter frame. To effect raising or lowering of the routers under control of rock shaft 59, there is secured to said shaft a substantially vertically disposed arm 95 (Fig. 6) having projecting laterally therefrom a stud 96, which stud is received in a slot 97 in an elbow lever 98—99 loosely mounted on rock shaft 59. Arm 98 of the elbow lever is received in a suitable bearing member connected with router spindle base 92.

It will be noted that rock shaft 59 is moved to advance cutters toward the work through a yieldable connection afforded by spring 72 (Fig. 5). A more exact adjustment of the yieldable connection is secured by means of springs 100 which may encircle rods 101 pivoted on arms 102 upstanding from the two driven sections of rock shaft 59. Rods 101 pass through apertures in upstanding plates 103 secured to cutter frame 26, and the springs 100 are adjustable by means of nuts 104 upon the rods. Similar and separate adjusting devices for the router drive just described are provided by pivoting to the arm 99 (Fig. 6) of each elbow lever a rod 105 which passes through the same abutment member 103 and is surrounded by a spring 106 held by an adjustable member 107.

It will be apparent that when the piston of hydraulic cylinder 81 is moved to the left from the position shown in Fig. 5, the rotation of rock shaft 59 will lower all four checkering saws and the two routers, and that only one cutting tool associated with each arbor is in position to engage the workpiece thereon, the desired tool having been selected by the proper actuation of the cutter selector cylinders 35 and 36, and the shifting thereby of cutter frame 26.

As shown in Fig. 19, the width of the cut made by each router is substantially one-and-one-half times the pitch or spacing of adjacent saw cuts. For this reason, the center line of the router is offset to the left from the center line of the saws by an amount equal to one-half the pitch of the saw cuts. This arrangement and dimensioning necessitates associating with each router cut one extra indexing of the work, which is accomplished by one cycle of carriage movement in which no cutter engages the work. For the right hand helix the idle carriage stroke precedes the router cut, and for the left hand helix the idle stroke follows the router cut.

MAIN CARRIAGE

As above mentioned, the workpieces W, upon which the cutters and routers operate, are supported on arbors 17, 18, mounted for rotation upon a reciprocating main carriage 16. Movement of this carriage is effected by the piston 120 of a carriage cylinder 121 held in a bridge frame, identified generally by numeral 122, secured to the main frame. Said piston 120 is connected at 123 to a suitable frame secured to the carriage 16. The valves of carriage cylinder 121 are controlled primarily by four micro-switches LS–1, LS–2, LS–4 and LS–5, suitably mounted in the carriage 16. Switches LS–1 and LS–2 are associated with the normal or starting (rightward, Figs. 8 and 8–A) position of the carriage, while switches LS–4 and LS–5 are associated with the advanced position or end of the working stroke.

The carriage being an assembly of substantial total mass and inertia, it is necessary to provide means for bringing it to a gradual, rather than an abrupt, stop, at the end of its movement in either direction. Both the starting and the stopping of the carriage are under the control of stops on an index or stop wheel, identified generally as 128, mounted for rotation in the main frame and to be hereinafter more fully described. The index wheel stops act upon two plungers 129, 130, mounted in brackets 149 and 150 secured to and accurately adjustable upon the carriage through adjustment screws 145 and 146. Plunger 129 controls switches LS-4 and LS-5 associated with the advanced position of the carriage, while plunger 130 controls switches LS-1 and LS-2 associated with the home position of the carriage. The energization of switches LS-1 and LS-4 respectively actuates a valve which cuts off the main hydraulic fluid passage to cylinder 121, while leaving unaffected an auxiliary fluid passage. These switches are actuated respectively as the carriage approaches to within say ¾" from the end of its stroke, with the result that the carriage completes the last ¾" (more or less) of its stroke in either direction under reduced power and at reduced speed. The circuits including switches LS-2 and LS-5 respectively control the main passages of hydraulic fluid to cylinder 121 to propel the carriage away from said switches respectively.

Plunger 130 reciprocates through a longitudinally disposed aperture in bracket 150. The configuration of the pattern of stops on stop wheel 128 corresponding to the pattern to be cut (see Fig. 16) is such that plunger 129 must at times be swung aside by lateral engagement with one of said stops and automatically restored to effective position when it has moved longitudinally to disengage such stop. Accordingly, plunger 129 occupies a longitudinal bore in an arm 110 which projects horizontally and generally longitudinally of the machine from the lower end of a boss 111 mounted for rotation in a bracket 149. To the upper end of boss 111 is secured a centering cam 112 which is engaged by a follower 113 urged toward the cam by a cup-shaped actuator 114 partially housing a spring 115 held in place in an upper and horizontally extending portion of bracket 149 by an abutment screw 116. The configuration of cam 112 is such that when the arm 110 is swung aside, by lateral engagement with a stop, spring 115 is compressed and, as soon as arm 110 is freed, the spring is effective to restore arm 110 and plunger 129 to normal position. Plunger rod 129 is provided with a cap 117 which slides upon the exterior surface of the reduced diameter end portion of arm 110.

The operating connections between plungers 129 and 130 respectively and the switches operated thereby are substantially identical except that the arm 131 (Fig. 11) associated with plunger 129 is of such width as to maintain contact with the end of said plunger when the plunger and its mounting are oscillated in the manner just described. Each plunger acts on an arm 131 depending from the mid-portion of a rock shaft 132. Near its ends each rock shaft carries arms 133, 134, having pivoted thereto links 135 and 136, which pass through apertures in a part of the carriage and are urged downwardly by springs 137 and 138. The carriage stopping switches must be actuated immediately upon the engagement of plunger 129 or 130 with a stop on the index wheel 128. For this purpose, each link 136 acts on one arm of an elbow lever 139 pivoted at 140, which elbow lever engages a micro-switch operating plunger 141 through a cam face having an active portion 142 and a dwell 143, the dwell portion 143 being effective to hold the switch in closed position after it has been closed by the active surface 142. The upper end of each link 135 is spaced an appropriate distance from the operating plunger 144 of the second micro-switch with the result that this switch is not closed until the retarded movement of the carriage to the end of its stroke is substantially complete.

INDEX AND HELIX SLIDES

Fig. 15 is a somewhat diagrammatic development of a typical checker pattern. It will be noted that this pattern is symmetrical with respect to a center line c, and that the first border cut b of the right hand helix begins at the point a on this center line. However, successive checkering cuts begin at points along the border b2 of the left-hand helix, which points progressively recede from the center line, as well as being longitudinally displaced from the point a. The longitudinal displacement is taken care of by the arrangement of the stops on the index wheel 128. The means for rotationally indexing the workpiece between successive checkering cuts and rotating the workpiece during the traverse of the carriage may be as follows:

Held in brackets 162 secured to the carriage are a pair of rods 160, 161, upon which is slidably mounted, through suitable bosses 163, an index slide or plate 164. Depending from the index slide 164 is a bracket 165 which carries an interiorly threaded boss 166 adapted to receive a screw 167 which is indexed with the aforementioned index wheel 128 in a manner to be described. Thus, between succesive operating movements of the carriage, the index slide undergoes a longitudinal displacement. Mounted for rotation upon the index slide 164 is a helix slide base 168, which base comprises a dovetail groove 169 adapted to slidably receive the helix slide 170. As clearly seen in Fig. 9, the helix slide base and the slide-way groove 169 therein are disposed with respect to the longitudinal axis of the machine at an angle corresponding to the angle of the helical pattern to be cut. Secured to and upstanding from the helix slide 170 is a bearing post 171 which, through suitable bearings, is received in a hollow boss 172 formed on a transversely extending bar 173. Each end of the bar 173 carries devices associated with one of the work-holding arbors 17 and 18, and a description of one of these devices will suffice. Each end of bar 173 is secured to a V-block 174 received in a dovetail base 175 secured to the carriage 16. To each V-block 174 are secured two short racks 176—177, which racks engage respectively with pinions 178—179 secured to the work-holding arbors. The purpose of the dual rack-and-pinion drive is to obviate back-lash in the constantly reversing motion transmitted from the racks to the pinions.

It will be apparent that, due to the connection 174—175 between the bar 173 and the carriage, the bar 173 reciprocates with the carriage, and that in the movement of the carriage and bar 173, through connection 172—171 the helix slide traverses the angularly disposed slide-way 169, moving the bar 173 endwise (transversely of the machine), and through pinions 178 and 179 rotating the work arbors. In this manner, during each working stroke of the carriage, the particular cutter operting upon a workpiece is caused to make a diagonally disposed or helical cut thereon. During the return of the carriage, after each working stroke, the index slide 164 is shifted, as above mentioned. Its longitudinal movement causes an appropriate displacement of the helix slide in the diagonally disposed way 169 and through bar 173 etc., rotates the work to the correct position for starting the next working stroke.

The helix slide base 168 remains in the angular position shown in full lines in Fig. 9 throughout the cutting of the full series of border and checkering grooves of the right-hand helix. This helix having been completed, it is necessary to reverse the helix slide base, bringing it to the position indicated in dotted lines in Fig. 9. To effect this reversal, the helix slide base is provided with a centrally disposed boss 180 which extends downwardly through a bushed aperture in index slide 164 and carries a pinion 181 engaged by a rack 182 secured to piston rod 183 projecting from hydraulic cylinder 184. The flow of fluid to cylinder 184 is controlled by the movement of the carriage to extreme positions corresponding to the end points a and d of the checker pattern, in a manner to be described. The pressure in the hydraulic circuit is adequate to hold the helix slide base in one or the other of its extreme positions, as determined by adjustable stops 185 and 186, which stops engage appropriate pads 187, 188 on said helix slide base. Micro-switches LS-11 and LS-12, appropriately positioned on the index slide, are so wired in the carriage work stroke controlling circuit as to require that one or the other of them be contacted by the helix slide to enable the starting of the carriage.

INDEXING

The mechanism for performing the various indexing movements, some of which have been heretofore described, may comprise a cylinder 200. The flow of hydraulic fluid to this cylinder is controlled by fluid pressure in the line associated with carriage cylinder 121, and indexing can take place only when the cutters are disengaged and the carriage is in its return movement. The piston rod 201 of cylinder 200 has secured thereto a rack 202 which engages a pinion 203 secured to an arbor 204, which arbor carries an arm 205 having pivoted thereto at 206 an adjustable link 207. The opposite end of link 207 is forked to form spaced bearings for a pawl-carrying stud 208. Between the two arms of the fork the stud is received in a bearing aperture at the end of a rocker arm 209 loosely mounted on an arbor 210. Said stud 208 carries two spaced and reversely facing pawls 211 and 212. Pawl 211 actuates a ratchet disk 213, and pawl 212 actuates a second ratchet disk 214, both disks being loosely mounted on arbor 210. Pawls 211 and 212, respectively, are held in contact with the associated ratchet disks by suitable springs, such as 215 and 216. Ratchet disks 213 and 214 are yieldingly retained in the positions to which they are moved by their respective pawls by suitable detent means such as a double-ended spring-urged detent 217 interposed between the two ratchet disks and held in a mounting block 218. Each ratchet disk is provided with apertures 219 adapted to receive the rounded ends of the duplex detent member and spaced from each other by an amount corresponding to the displacement of the ratchet disks in each stroke of the pawls. Secured to ratchet disk 214 is an outwardly facing jaw clutch member 220, and secured to ratchet disk 213 is an outwardly facing jaw clutch member 221. Adapted for engagement with clutch members 220 and 221, respectively, are clutch plates 222 and 223 slidably, but non-rotatably, mounted on arbor 210. Each of the clutch plates 222 and 223 is provided with an outwardly extending boss 224 and 225 having therein an annular recess adapted to receive the forked end of a clutch controlling arm 226 and 227. Arms 226 and 227 are secured to a rod 228 slidably held in fixed bearings 229 and 230. A suitable detent 231, which may conveniently be associated with bearing 230, engages one of two notches 232 in rod 228, to hold the clutch plates 222 and 223 in such positions that one or the other of them is engaged with the jaw clutch of the associated ratchet disk. One of the clutches will remain engaged, imparting the desired direction of indexing movement to the arbor 210, throughout the making of all cuts of the same inclination. When the inclination of the cuts is to be reversed, rod 228 is shifted longitudinally by means of a lever 233 pivoted to said rod at 234, having a fixed pivot 235, and pivotally joined at the opposite end to plunger 236 of a solenoid 237, which solenoid is actuated in conjunction with the reversal of the inclination of the helix slide base 168, as heretofore described. Arbor 210 carries a gear wheel comprising two relatively adjustable halves 238, 239, the adjustment being provided to enable rotation in either direction, without "back lash." Said gear 238, 239 meshes with a gear 240 secured to the aforementioned index slide screw shaft 167. Likewise secured to the screw shaft is a pinion 241 which engages a gear 242 secured to a counter-shaft 243, which counter-shaft carries a pinion 244 engaged by a gear 245 secured to an index shaft 246. Said index shaft 246 carries the aforementioned index or stop wheel 128, and likewise carries a series of three cutter selecting disks or cams 247, 248 and 249, the function of which will be presently described.

Stop wheel 128 comprises a broad rim 250 to which is secured an annular supporting piece 251. Adjustably held in piece 251 are two series of stops, the stops of one series 252 facing to the right (Fig. 8–A) and the stops of the second series 253 facing to the left. The particular stops of each series which are directly opposite each other may be considered a pair, and the pairs of stops showing in the section, Fig. 8–A, are identified as 252ª, 253ª, and 252ˣ, 253ˣ. One pair of stops is associated with each pattern line of each inclination or helix, and a few selected stops are associated with idle carriage movements. Stops 252 actuate plunger 129 at the end of each working stroke of the carriage, and stops 253 actuate plunger 130 at the end of each return stroke, with the results heretofore described. The index wheel is advanced stepwise, as heretofore described, through slightly less than one full revolution. Its movement is then reversed, and it returns stepwise to its initial or No. 1 position. Thus, each pair of stops functions in conjunction with the cutting of one line or other operation of both the right-hand and the left-hand helix. A diagrammatic development of the set of stops is shown in Fig. 16.

Associated with cam disks 247, 248 and 249, respectively, are micro-switches LS-15, LS-16 and LS-17, having actuating devices provided with rollers 257, 258 and 259, which follow the peripheries of the respective cams and activate the switches by entering certain cut-outs in the cam peripheries. Developments of the cam peripheries are shown in Fig. 14. Each comprises extended dwell portons corresponding to the succession of saw cuts, and active surfaces in the form of notches or cut-outs associated with the several border or router cuts, and with the idle carriage stroke which accompanies each router cut.

Cam 247 is the "non-cutting" cam. Its switch LS-15 is normally closed and is in the control circuit for cutter actuating cylinder 181. When roller 257 enters one of the cut-outs 247ℹ in cam 247 the switch is opened and the carriage moves through one idle cycle.

Cam 248 may be called the "saw" cam. Its switch LS-16 is normally closed and is in the control circuit for the upper cutter selector cylinder 36. When roller 258 enters one of the cut-outs 2481 the circuit is opened, releasing the piston of cylinder 36 for movement to the opposite end of said cylinder.

Cam 249 is the "router" cam. Its switch LS-17 is normally open and is in the control circuit which effects the shift of piston cylinder 36 when said piston has been freed for such movement by the opening of switch LS-16. This takes place when roller 259 closes switch LS-17 by dropping into one of the cut-outs 2491.

HYDRAULIC AND ELECTRIC SYSTEMS

The electric and hydraulic systems, respectively, are diagrammatically shown in Figs. 17 and 18, which figures include standard commercial symbols.

The flow of hydraulic fluid to the several cylinders above described (except the index cylinder 200) is controlled by solenoid valves, the several solenoids being in circuits comprising relays which are energized under the control of the various micro-switches. Both the micro-switches and the solenoid valves are commercial articles requiring no specific description. It is sufficient to say that a solenoid valve comprises a piston movable in a chamber or valve chest and having connected to opposite faces thereof rods of magnetic material which constitute solenoid plungers. Each rod is adapted to enter the central aperture of a solenoid coil. The different positions of the piston or "spool" within the chamber establish the requisite connections between a fluid source, one or more tubes communicating with the piston cylinder to be actuated, and a drainage port.

The machine may be conveniently powered by a 440-volt 3-phase electric circuit, in which circuit is placed a pump motor 260 which may be directly connected to the fluid pump 261 from which hydraulic fluid is delivered to the mains 262 and 263 which supply fluid to the various valves. A tube circuit 264 from the pump to the oil sump or reservoir 265 includes valve I which must be closed by energizing solenoid S13 in order to deliver fluid to the mains 262 and 263.

The index cylinder 200 is controlled by pressure in the hydraulic line which effects the return or idle movement of the carriage, so that indexing can take place only during this movement. The valve A controlling the main or carriage cylinder is spring-centered, to be brought to an intermediate position whenever the circuit by which it is held in one of its end positions is de-energized.

OPERATION

Starting

The right-hand helix is cut first, and Fig. 17 shows the condition of the circuits at the beginning of the first (non-cutting) carriage traverse. It will be noted that several of the relays have multiple contacts, some of which are closed and some open under a given condition. In its initial or starting position, the carriage has moved as far as possible to the right (Figs. 1, 8 and 8-A), and in so doing has opened the normally-closed micro-switch LS-19A (Figs. 1 and 17), stopping the machine. The work arbors 17 and 18 having been loaded with workpieces W, the machine is started by momentarily closing the "start" switch, which energizes relays CR1 and CR4. The purpose of the relay CR4 is to maintain a closed circuit until the carriage has moved away from limit switch LS-19A, permitting this switch to close. Relay switch R4 is normally closed, and is provided with a delay element which enables it to remain closed until the carriage has moved far enough to free the normally closed switch LS-19A. Relay CR1, having been energized as just described, remains energized throughout the entire operation of the machine. Its first effect is to energize solenoid S13, heretofore mentioned, closing the valve I and directing fluid from the pump 261 into the mains 262 and 263. An accumulator 2620 (Fig. 18) serves to maintain pressure in the main 262.

CARRIAGE MOVEMENT—NON-CUTTING

There are two sources of fluid supply to the carriage cylinder 121. The principal source is through the spring-centered solenoid valve A, and the auxiliary or secondary source is through hydraulically piloted valve B.

The working stroke of the carriage begins when solenoid S2 is energized, displacing the spring-centered valve A to admit fluid through passage 266 to the right (Fig. 18) end of cylinder 121. To energize this solenoid, several conditions must be satisfied: first, the helix slide base 168 must be correctly positioned as shown in full lines in Fig. 9, closing the normally open switch LS-12; second, the piston of cutter selector cylinder 35 must be in its leftward (Fig. 3) position, closing switch LS-8, and the piston of cutter selector cylinder 36 must be in its leftward position, closing switch LS-10; third, the limit switch LS-2 on the carriage must be closed by the engagement of plunger 130 with the first stop, 253a, on stop wheel 128. As soon as the carriage starts to move, LS-2 will open, hence it is placed in shunt with a seal relay R5. In the same circuit are the normally closed contacts of relay R2 and the normally open contacts of relay R3.

The above three conditions being satisfied, it is still necessary to close the open contacts and open the closed contacts of relay R3. The first cycle of carriage movement being non-cutting (position I, Figs. 14, 16 and 19), this is done by the non-cutting cam 247. The roller 257 of switch LS-15 is engaged in notch 2471 of this cam, closing this normally open switch and energizing relay R3. The same circuit also contains limit switch LS-4 (carriage retard, advanced position).

Solenoid S2 being thus energized, fluid is admitted to passage 266 communicating with the right end of cylinder 121. A by-pass 267 from 266 actuates pressure-controlled valve B to establish communication from branch main 2631 to passage 2661 which also, through manual needle valve 2662, communicates with the right end of cylinder 121. Thus, the piston 120 and with it the carriage are moved through a working stroke under the pressure of fluid admitted through both solenoid valve A and pressure-controlled valve B.

As the carriage approaches its leftward or advanced position, plunger 130 thereon is displaced by contact with stop 252a. This first opens the normally closed switch LS-4, breaking the circuit through solenoid S2 and seal relay R5. Valve A, being spring centered, immediately assumes a neutral position in which both intake and exhaust ports are cut off from either cylinder feeding port. Pressure in passage 266 has not been reduced, so valve B has not moved, the carriage completes its advance stroke slowly under the restricted flow of fluid through valve B, and in so doing closes the normally open limit switch LS–5.

The closing of switch LS–5 completes the circuit through R3 and LS–1 to solenoid S1 of valve A, displacing this valve to admit fluid through passage 268 to the left end of carriage cylinder 121, the flow again being augmented by that through valve B which is displaced by fluid admitted from 268 through by-pass 269. A seal relay R6 short circuits switch LS–5, which is opened as soon as the carriage starts its return stroke, until the circuit is broken by the opening of switch LS–1 (carriage retard, home position), which likewise breaks the circuit through S1, permitting valve A to spring to center position.

INDEXING

During carriage return, as just described, the index cylinder 200 is actuated to shift the index stop wheel 128 and index cams one step, or to the II position (Figs. 14, 16 and 19). Fluid is passed to the upper (Fig. 18, left Fig. 13) end of cylinder 200 through passage 270 from pressure-actuated valve D, which is piloted from the feed lines for carriage cylinder 121 through a solenoid valve E. Tubes 271 and 272 connect valve E with passages 266 and 268 respectively. Valve E is a four-way valve comprising a single solenoid S5 which remains de-energized throughout the cutting of the first, or right-hand, helix, the valve E being thus so positioned that the pressure (incident to carriage return) in tube 272 establishes communication from main 262 to tube 273. Pressure in 273 so affects valve D as to introduce fluid from main 262 into tube 270 and the upper end of cylinder 200. In carriage advance, pressure in 268—272 is reduced and pressure in 266—271 increased, thus shifting valve E to introduce fluid into tube 274, reversing valve D to introduce fluid from the main into passage 275 and the lower end of cylinder 200. At this time the clutch 221—223 is engaged and clutch 220—222 is disengaged, so that the return of piston 201 does not move the index arbor 210. It will be noted that the index clutch solenoid S14 is energized by the aforementioned relay R2.

FIRST ROUTER CUT

The non-cutting cycle being complete, including indexing as above-described, the indexed stop wheel 128 and index cams 247, 248 and 249 are now in II position (Figs. 14, 16 and 19), the point $a$ (Fig. 15) of each pattern to be cut being directly beneath a router 90. Roller 257 of switch LS–15, which, on the non-cutting cycle, energized R3 to close the circuit through solenoid S2 of carriage cylinder valve A, now rides on the periphery of cam 247, and all R3 contacts are reversed. Roller 259 is in cut-out 2491 of router cam 249, shifting switch LS–17 to energize the circuit to S17 and de-energize the circuit to S11. Roller 258 still occupies the double-width cut-out in saw cam 248 and its switch LS–16 remains open.

For all cuts of the right-hand helix, the piston of cutter frame cylinder 35 is in its leftward (Fig. 3, upper Fig. 17) position. It has been so disposed by the aforementioned relay R2, which energizes solenoid S7 of the 4-way valve F to admit fluid from main 262 to tubular connection 276.

For the making of a router cut, the piston of the upper cutter frame cylinder 36 must be oppositely disposed, placing the cutter frame in a central position. For the right-hand helix, limit switches LS–16 and LS–17 respectively are in series with solenoids S16 and S17 respectively of valve G which controls the flow of fluid to said upper cutter frame cylinder 36. Solenoid S16 is de-energized, the roller of switch LS–16 being in a cut-out in cam 248, leaving the valve free to be shifted by the energization of S17 through the closing shifting of switch LS–17 by cam 249. This shift of valve G admits fluid from main 262 through passage 277 to the left end of cylinder 36. The presence in series with LS–16 and LS–17 respectively of normally-closed (right-hand helix) relay contacts R2A should be noted.

The circuits being in the condition just explained, and limit switches LS–2 (carriage start), LS–8, LS–9 (cutter frame) and LS–12 (helix slide) being closed, solenoid S3 of valve C is energized, admitting fluid through tube 278 to cylinder 81, moving piston 80 to the right (Fig. 5) to rock shaft 59 and lower the cutters to engage the routers with the work. Full displacement of piston 81 closes limit switch LS–6, energizing solenoid S2 of carriage cylinder valve A to start the working stroke of the carriage.

Since the router removes much more material than the saws, provision is made for advancing the carriage at reduced speed during the router operation. This is accomplished by restricting the escape of fluid from the left end of carriage cylinder 120 as the piston 121 moves to the left therein. In the aforementioned passages 268 is placed a valve J controlled by a solenoid S11 and by-passed by a tubular connection containing a manually-adjustable needle valve 279. Solenoid S11 is de-energized to close the valve J by the double throw or "three-way" switch LS–17 which alternatively closes the circuit through S11 and the circuit through S17.

The carriage advances at reduced speed with the routers engaged with the work, making the first border cut $b$ (Fig. 15). Approaching the end of its stroke, it is first retarded by the activation of limit switch LS–4, as heretofore described, and stopped against stop wheel 128 as switch LS–5 is activated. Before the return movement starts, the routers must be lifted, to disengage the work. For this purpose, the closing of LS–5 energizes solenoid S4 of cutter cylinder valve C, admitting fluid through tube 282 to propel piston 80 to the left (Fig. 3). Said piston being in its leftward position, limit switch LS–3 is closed, to energize both solenoid S1 of carriage cylinder valve A and seal relay R6 of limit switch LS–5. The carriage thereupon returns to home position, the indexing devices operating during its return, as heretofore described.

SAW CUTS

The next cut to be made is the saw cut adjacent and parallel to the border cut $b$. The cutter frame has been shifted in conjunction with indexing, to select the saws for the right-hand helix. This is done under the control of index cams 248 and 249. The work and index mechanism are in the III position (Figs. 14, 16 and 19). Roller 259 of router selector switch LS–17 rides on the periphery of its cam, shifting LS–17 to de-energize S17 of valve G and energize S11 of valve J. Roller 258 of limit switch LS–16, which in the I and II positions occupied a cut-out in its cam 248, now rides on the periphery of the cam, closing switch LS–16 which, through closed contacts of relay R2A, energizes solenoid S16 of valve G, which is thereby shifted to admit fluid through tube 280, propelling the piston of cylinder 36 to the left. Said piston being in its leftward position and limit switches LS-2, LS-8, LS-10 and LS-12 being closed, as heretofore described, solenoid S3 is energized to lower the cutters, and, when the cutters are fully lowered, limit switch LS-6 is closed to complete the circuit through the solenoid S2 of carriage valve A. The carriage thereupon advances and returns in the manner above described.

There follows a sequence of any desired number of identical right-hand saw cuts, the indexing devices being moved one step during the return of the carriage after each such cut. When the work reaches the position of the second border cut b2, the indexed cams 247, 248 and 249 have the position with respect to the switches controlled thereby identified for convenience as XXV, and the succeeding three operations of non-cutting, router selection and cut, and saw selection, are identical with those above described. The sequence continues throughout the cutting of the right-hand helix, terminating with the making of the border cut b4.

LEFT-HAND HELIX

In the cutting of the right-hand helix, the index slide has moved leftward step-by-step to such a position that the last router cut b4 is finished at the point c at the extreme end of the pattern. Indexing takes place, as heretofore shown, on the return stroke of the carriage, and the usual indexing occurs as the carriage begins its return stroke following the router cut b4. This final indexing movement places the indexed cams 247, 248 and 249 in position LXXX (Fig. 14) and advances the index slide 164 to a position such that on the return of the carriage an arm 280 on the index slide closes a limit switch LS-18 mounted on the carriage. The effect of closing LS-18 is to activate relays R2 and R2A, with the result that the position of all R2 and R2A contacts, as shown in Fig. 17, is reversed. Those contacts shown as closed are now open, and those shown as open are now closed. Solenoids S7 (associated with cutter frame cylinder 35), S10 (associated with helix angle cylinder 184), and S14 (associated with clutch solenoid) are now cut out, and are replaced respectively by S8, S9 and S15, associated respectively with the same devices, also S5 (associated with the index cylinder 200) is now energized.

The energization of S15 with the de-energization of S14 immediately shifts the index clutch, engaging clutch 221—223 and disengaging clutch 220—222. This action takes place without any delay, conditioning the clutch so that the first reverse index movement will take place upon the return of piston 201 to its leftward position, said piston having been displaced to the right to perform the final forward indexing movement. The energization of S5 effects the reversal of the pressure piloted valve D, admitting fluid under pressure to passage 275, returning piston 201 of cylinder 200 to its leftward position. The index clutch solenoid having already been reversed, in the time interval necessary for the successive shifts in valve E and valve D, the return movement of piston 201 effects the first reverse index movement, to bring the index cams, etc., to position LXXIX.

The energization of S8 with the de-energization of S7 shifts valve F to admit fluid through passage 281 to the left end of the lower cutter frame or selector cylinder 35, moving the piston thereof to the right. The energization of S9 with the de-energization of S10 shifts the valve H to admit fluid to the helix angle cylinder 184, shifting the helix slide base 168 from the full-line right helix position (Fig. 9) to the dotted line left helix position. Limit switches LS-8 (cutter frame cylinder 35, left), and LS-12 (helix angle, right) are also eliminated from the circuit by the opening of the normally-closed relay contacts R2, while limit switches LS-7 (cutter frame cylinder 35, right) and LS-11 (helix angle, left) are placed in the circuit by the closing of the normally-open contacts R2.

By reason of the offset of the center line of router 90 to the left from the center line of saws 45, in cutting the left-hand helix, the non-cutting cycle follows the router cut instead of preceding it as it did for the right-hand helix. The relative positions of cut-outs 2471 and 2491 in their respective cams takes care of this, it being remembered that for the right helix the cam surfaces move leftward (Fig. 14) past the switch operators, while for the left-hand helix said cam surfaces move rightward. Since for the left-hand helix the piston of cylinder 36 must, for a saw cut, be positioned to the right, instead of to the left, the connections from limit switches LS-16 and LS-17 to solenoids S16 and S17 are reversed, switch LS-16 controlling solenoid S17 and switch LS-17 controlling solenoid S16. This change is effected through the cross-over and reversing contacts of relay R3, as clearly shown in Fig. 17.

The machine thus automatically conditioned proceeds without interruption through the sequence of bordering and checkering cuts of the left-hand helix. During the return of the carriage, after making the last router or border cut b8, the index wheel 128 is restored to I position and the carriage moves to the right a distance sufficient to open normally closed limit switch LS-19A, de-energizing relay R1 and thus restoring all circuits to their initial condition. Solenoid S5 of valve E is de-energized, reversing the pressure connections 273 and 274 into valve D which in turn reverses the pressure outlet to index cylinder 200. Fluid reserve pressure from accumulator 2620 returns the piston of index cylinder 200 to the correct position for a right hand helix. The machine is now ready to perform a second operating cycle upon manually closing the "start" switch.

The representative embodiment of the invention which has been illustrated and described is susceptible to many variations and modifications.

What is claimed is:

1. Apparatus for cutting on a workpiece having a longitudinal axis a plurality of patterns, each pattern comprising a plurality of border cuts separated by a predetermined number of checker cuts, the cuts of one pattern being disposed at a predetermined positive angle to said axis and the cuts of a second pattern being disposed at a negative angle to said axis; said apparatus comprising a main carriage; a workholding arbor rotatably held in said carriage; arbor rotating means; arbor indexing means; reversing means for said arbor rotating and indexing means; a tool frame; a plurality of tools including a checkering tool for each pattern and a bordering tool common to both patterns mounted for movement on said tool frame and relative to said arbor; actuating and control devices for said main carriage, said arbor, said arbor rotating and indexing means, said tool frame and said tools for performing automatically and without interruption a series of sequences of operations comprising sequence A, an idle cycle followed by a border cut; sequence B, a predetermined number of checker cuts; the repetition of sequence A; the actuation of said reversing means; sequence C, a border cut followed by an idle cycle; and the repetition of sequences B and C in turn a predetermined number of times.

2. Apparatus according to claim 1, in which said actuating and control devices comprise electrically controlled fluid pressure actuated prime movers for said main carriage, said arbor indexing means, said arbor reversing means and said tool frame, respectively; and electrical control switches activated by movement of said carriage, said reversing means and said tool frame to predetermined positions.

3. Apparatus for impressing on a workpiece a pattern containing a plurality of dissimilar lines, said apparatus comprising a fixed base, a tool frame movable on said fixed base, a plurality of dissimilar tools on said tool frame adapted to form said dissimilar lines on said workpiece, a carriage movable on said base, control devices on said carriage, a workpiece holding arbor mounted for rotational movement on said carriage, means for moving said carriage and said arbor relative to the tools on said frame, and control means for said tool frame including elements engageable by said control devices in predetermined positions of said carriage for shifting said tool frame to select a tool thereon for engagement with a workpiece on said arbor.

4. Apparatus according to claim 3, comprising means operatively related to said tool frame and engaged by said control devices in predetermined positions of said carriage for engaging a selected tool with the work.

5. Apparatus according to claim 4, in which said tool engaging means is effective only in predetermined positions of said tool frame.

6. Apparatus for cutting a checker pattern comprising a plurality of relatively angularly disposed helices, each helix comprising a plurality of border cuts separated by a predetermined number of checker cuts, said apparatus comprising a fixed base, a carriage mounted for translational movement on said base, control devices on said carriage, a work holding arbor mounted for rotational movement in said carriage, means for translating said carriage, means for rotating said arbor, a tool holding frame mounted on said base for movement transversely of the axis of said arbor, a plurality of tools including a checkering tool for each helix and a bordering tool common to both helices carried by said tool frame, means actuated by said control devices in a predetermined position of said carriage for shifting said tool frame to position one of said tools for engagement with a workpiece on said arbor, and means actuated by said control devices in a predetermined position of said carriage for advancing all of said tools to bring the tools so positioned into engagement with the workpiece on said arbor.

7. Apparatus according to claim 6, comprising individual holders for said tools carried by said tool frame, a rock shaft comprised of a driver section and a driven section aligned with said driver section, means for oscillating said driver section, adjustable connections from said driver section to said driven sections, and adjustable connections from said driven sections to said individual tool holders.

8. Apparatus according to claim 7, comprising individual driving motors for said tools and flexible drive means from said individual motors to the tools held in said tool holders, whereby said tools may be advanced to and retracted from the work while being driven by said motors.

9. Apparatus according to claim 6 in which said tool frame shifting means comprises a pair of fluid operated pistons and a common crank pivotally joined to said pistons and to a boss on said tool frame.

10. Apparatus according to claim 9 in which the supply of fluid to said fluid operated pistons is controlled by switch operating devices moving in synchronism with said work holding arbor.

11. Apparatus according to claim 10 comprising means whereby during the cutting of a helix of one angle one of said switch operating devices is effective to shift said tool frame to position a checkering tool for engagement with said work, and means for causing said switch operating device to shift said tool frame to position the bordering tool for engagement with the work during the cutting of the helix of the second angle.

12. Apparatus for impressing on a workpiece having a longitudinal axis a pattern of alternating sets of dissimilar lines extending in a direction oblique to said axis, said apparatus comprising a fixed base, a carriage supported for rectilinear reciprocating movement relative to said fixed base, a workpiece holding arbor rotatably mounted in said carriage, a plurality of tools of dissimilar configuration, a tool frame supporting said tools, means for shifting said tool frame relative to said fixed base to select a tool for operative engagement with a workpiece on said arbor, means for engaging a selected tool with a workpiece on said arbor, means for reciprocating said carriage through a cycle of advancing and return movements, and means for rotating said arbor as said carriage reciprocates; said arbor rotating means comprising a diagonally disposed guideway member, means for holding said guideway member in fixed position during the advance movement of said carriage, and means mounted on said carriage for transverse movement on said carriage and engaged in said guideway.

13. Apparatus according to claim 12, in which said arbor rotating means comprises a rack on said carriage and a pinion on said arbor engaged by said rack.

14. Apparatus according to claim 12, comprising an index slide movable on said base, said guideway member being mounted on said index slide.

15. Apparatus according to claim 14, comprising means on said base and in the path of movement of an element of said carriage for stopping the advance movement of said carriage in each of a plurality of predetermined positions and for initiating return movement of said carriage.

16. Apparatus according to claim 15, comprising means for indexing said slide on said base, said means being activated by said means for initiating the return movement of said carriage.

17. Apparatus according to claim 16, in which said indexing means comprises a ratchet device, a driver for said ratchet device, and motion transmitting means actuated by said ratchet device and operatively engaging said index slide, said ratchet device, said driver, and elements of said motion transmitting means being mounted on said base.

18. Apparatus according to claim 17, in which said motion transmitting means comprises a threaded boss secured to said index slide and a threaded shaft received by said threaded boss.

19. Apparatus according to claim 17, comprising motion controlling devices mounted on said carriage and an indexed stop wheel mounted in said base and actuated by said motion transmitting means, said indexed stop wheel being provided with a plurality of stops adapted for engagement by said motion controlling devices.

20. Apparatus according to claim 19, comprising a cam rotatably held in said base and driven by said motion transmitting means, a follower for said cam supported from said base, and tool selecting means controlled by said cam follower for activating said tool frame shifting means to select a tool of predetermined configuration.

21. Apparatus according to claim 20, comprising a second cam rotatably held in said base and driven by said motion transmitting means, a follower for said second cam supported from said base, and control means for said tool engaging means activated by said second cam follower.

22. Apparatus according to claim 19, in which said indexed wheel stops are arranged in opposed pairs adapted to limit the movement of the carriage in either direction, there being one pair of stops associated with each of a plurality of angular positions of said arbor.

23. Apparatus according to claim 21, comprising a third cam rotatably held in said base and driven by said motion transmitting means, a follower for said third cam supported from said base, and means controlled by said third cam follower for activating said tool frame shifting means to select a tool of a second and different configuration.

24. Apparatus according to claim 23, comprising means for reversing the direction of movement of said motion transmitting means by said ratchet device, thereby reversing the indexing movement of said arbor, said indexed stop wheel and said cams; said reversing means comprising an element mounted on said index slide in the path of movement of an element of said carriage.

25. Apparatus according to claim 19, comprising means actuated by said motion controlling devices for retarding the movement of said carriage preparatory to stopping the carriage at the end of a working stroke.

26. Apparatus according to claim 20, comprising means rendered effective by said tool selecting means for controlling the rate of movement of said carriage during its working stroke according to the tool selected.

27. Apparatus for impressing on a workpiece having a longitudinal axis a plurality of patterns, each pattern comprising a plurality of parallel checker cuts bounded by border cuts, the cuts of one pattern being disposed at a predetermined positive angle to said axis and the cuts of a second pattern being disposed at a negative angle to said axis; said apparatus comprising a fixed base, a carriage reciprocable on said base, a workpiece holding arbor rotatably held in said carriage, means for moving said carriage in the direction of the axis of said workpiece holding arbor through a working movement and a return movement, means comprising elements in the path of movement of an element of said carriage for stopping said carriage at the end of a working movement and initiating carriage return movement, means actuated by the movement of said carriage relative to said base for rotating said arbor throughout the movement of said carriage, means supported from said base and actuated by said carriage returning means for rotationally indexing said arbor, and means for reversing the rotational and indexing movements of said arbor actuated by movement of said carriage and said indexing means to predetermined positions.

28. Apparatus according to claim 27, in which said arbor rotating, indexing and index reversing means comprise an index slide mounted for rectilinear movement on said base, means actuated by said carriage returning means for shifting said index slide a predetermined amount, a pattern angle controlling member pivotally mounted on said index slide having therein a guideway initially disposed at an angle to the axis of said workpiece holding arbor corresponding to the positive angle pattern, means operatively connected to said arbor and mounted for movement on said carriage transverse to said arbor and engaged in said guideway, and means actuated by movement of said index slide to a predetermined position to rotate said pattern angle controlling member to a position corresponding to the negative angle pattern.

29. Apparatus according to claim 27, comprising a pattern determining stop wheel, and means driven by said arbor indexing means for indexing said stop wheel and reversing the indexing movement of said stop wheel in unison with the indexing and reversing of said arbor.

30. Apparatus for impressing on a workpiece having a longitudinal axis a plurality of patterns, each pattern comprising a plurality of figures and each figure comprising a plurality of parallel checker cuts bounded by border cuts, the cuts of one pattern being disposed at a predetermined positive angle to said axis and the cuts of a second pattern being disposed at a predetermined negative angle to said axis; said apparatus comprising a fixed base, a carriage reciprocable on said base, a workpiece holding arbor rotatably held in said carriage, means for moving said carriage in the direction of the axis of said workpiece holding arbor through a cycle comprising a working movement and a return movement, means comprising an element on said carriage and a stop wheel engaged thereby for stopping said carriage at the end of a working movement, means for initiating carriage return movement, means actuated by movement of said carriage relative to said base for rotating said arbor throughout the movement of said carriage, means actuated by said carriage return means for rotationally indexing said arbor and said stop wheel, means for reversing the rotational and indexing movements of said arbor actuated by movement of said carriage and said indexing means to predetermined positions, a tool frame mounted on said base for movement transverse to the axis of said arbor, a plurality of tools carried by said tool frame, said plurality of tools comprising a tool for forming said positive angle checker cuts, a tool for forming said negative angle checker cuts and a tool for forming said border cuts, means actuated by an element of said carriage when in predetermined positions for shifting said tool frame to select one of said plurality of tools for engagement with a workpiece on said arbor, and means operable by said arbor rotation and indexing reversing means for shifting said tool frame to select a different tool for engagement with a workpiece on said arbor.

31. Apparatus according to claim 30, comprising means actuated by an element of said carriage when in predetermined positions for advancing a selected tool to engage a workpiece on said arbor.

32. Apparatus according to claim 31, comprising means actuated by said carriage stopping means for retracting an engaged tool to a position free of the workpiece on said arbor.

FRANK H. McDONALD.
JAMES J. MACKRELL.
KOSTA P. RADO.
JOHN R. BRAND.

References Cited in the file of this patent

UNITED STATES PATENTS

| Number | Name | Date |
|---|---|---|
| 16,108 | Anderson | Nov. 25, 1856 |
| 165,404 | Blake | July 13, 1875 |
| 376,134 | Birge | Jan. 10, 1888 |
| 410,678 | Sachs | Sept. 10, 1889 |
| 1,900,203 | Seiler | Mar. 7, 1933 |
| 2,053,523 | Gurrieri et al. | Sept. 29, 1936 |
| 2,370,032 | Groen | Feb. 20, 1945 |

FOREIGN PATENTS

| Number | Country | Date |
|---|---|---|
| 10,671 | Great Britain | of 1885 |

Certificate of Correction

Patent No. 2,638,946 — May 19, 1953

FRANK H. McDONALD ET AL.

It is hereby certified that error appears in the printed specification of the above numbered patent requiring correction as follows:

Column 5, lines 66 and 67, strike out "base", both occurrences; column 10, line 66, for "portons" read *portions*; column 14, line 9, strike out "closing"; line 32, for "passages" read *passage*; column 17, line 68, for "a driven section" read *driven sections*; column 21, line 3, for "compris-" read *comprising*; and that the said Letters Patent should be read as corrected above, so that the same may conform to the record of the case in the Patent Office.

Signed and sealed this 28th day of July, A. D. 1953.

[SEAL]

THOMAS F. MURPHY,
*Assistant Commissioner of Patents.*